US011449447B2

(12) United States Patent
Hu et al.

(10) Patent No.: US 11,449,447 B2
(45) Date of Patent: Sep. 20, 2022

(54) LATENCY AND JITTER FOR TRAFFIC OVER PCIE

(71) Applicant: TEXAS INSTRUMENTS INCORPORATED, Dallas, TX (US)

(72) Inventors: Chunhua Hu, Plano, TX (US); Sanand Prasad, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/139,441

(22) Filed: Dec. 31, 2020

(65) Prior Publication Data
US 2022/0206977 A1 Jun. 30, 2022

(51) Int. Cl.
*G06F 13/28* (2006.01)
*G06F 13/42* (2006.01)

(52) U.S. Cl.
CPC .......... *G06F 13/28* (2013.01); *G06F 13/4221* (2013.01); *G06F 2213/0026* (2013.01); *G06F 2213/28* (2013.01)

(58) Field of Classification Search
CPC ................. G06F 13/28; G06F 13/4221; G06F 2213/0026; G06F 2213/28
See application file for complete search history.

(56) References Cited

U.S. PATENT DOCUMENTS

| 2005/0276267 | A1* | 12/2005 | Metsala | H04L 47/30 370/395.2 |
| 2008/0263246 | A1* | 10/2008 | Larson | G06F 13/4221 710/107 |
| 2014/0304450 | A1* | 10/2014 | Maeda | H04L 49/70 710/316 |
| 2015/0317266 | A1* | 11/2015 | Kramer | G06F 13/4221 710/310 |
| 2019/0012290 | A1* | 1/2019 | Watanabe | G06F 13/385 |
| 2019/0121781 | A1* | 4/2019 | Kasichainula | G06F 15/17331 |
| 2019/0356611 | A1* | 11/2019 | Das Sharma | H04L 49/9005 |
| 2020/0301859 | A1* | 9/2020 | Chin | G06F 13/1668 |
| 2020/0304426 | A1* | 9/2020 | Zhao | H04L 12/66 |
| 2021/0014177 | A1* | 1/2021 | Kasichainula | G06F 13/128 |

OTHER PUBLICATIONS

Kolokowsky, Steve and Davis, Trevor; "Blistering Traffic Speeds: A Detailed Look Inside PCI Express"; Cypress Semiconductor; EE Times; accessed at URL:<https://www.eetimes.com/blistering-traffic-speeds-a-detailed-look-inside-pci-express/#>; Oct. 25, 2005. (Year: 2005).*
PCI Express Base Specification Revision 3.0; PCI-SIG; pp. 1-4 and 178-184; Nov. 10, 2010. (Year: 2010).*

* cited by examiner

*Primary Examiner* — Glenn A. Auve
(74) *Attorney, Agent, or Firm* — Brian D. Graham; Charles A. Brill; Frank D. Cimino

(57) ABSTRACT

A method includes transmitting first data with a first priority through a first dedicated interface on a transmit side of a PCIe system. The method also includes transmitting second data with a second priority through a second dedicated interface on the transmit side of the PCIe system. The method includes transmitting the first data and the second data to a receive side of the PCIe system using two or more virtual channels over a PCIe link, where the first data uses a first virtual channel and the second data uses a second virtual channel.

20 Claims, 3 Drawing Sheets

LATENCY AND JITTER FOR TRAFFIC OVER PCIE

BACKGROUND

Peripheral component interconnect express (PCIe) is a widely-used interface standard for high-speed components. PCIe implementations include a transmit side, a receive side, and a link connecting the two sides. PCIe supports multiple virtual channels (VC). Each VC can be used to transport different types of traffic.

SUMMARY

In accordance with at least one example of the description, a method includes transmitting first data with a first priority through a first dedicated interface on a transmit side of a PCIe system. The method also includes transmitting second data with a second priority through a second dedicated interface on the transmit side of the PCIe system. The method includes transmitting the first data and the second data to a receive side of the PCIe system using two or more virtual channels over a PCIe link, where the first data uses a first virtual channel and the second data uses a second virtual channel.

In accordance with at least one example of the description, a PCIe system includes a transmit side including a first dedicated interface and a second dedicated interface, the first dedicated interface coupled to a first transmit queue for a first virtual channel, and the second dedicated interface coupled to a second transmit queue for a second virtual channel. The system also includes a crossbar having a first dedicated output port coupled to the first dedicated interface and a second dedicated output port coupled to the second dedicated interface.

In accordance with at least one example of the description, a system includes a PCIe transmit side including a first dedicated interface and a second dedicated interface, the first dedicated interface configured to receive data with a first priority and the second dedicated interface configured to receive data with a second priority. The system also includes a PCIe link coupled to the PCIe transmit side, the PCIe link including a first virtual channel and a second virtual channel, the first virtual channel configured to transmit data with the first priority and the second virtual channel configured to transmit data with the second priority. The system includes a PCIe receive side including a third dedicated interface and a fourth dedicated interface, the third dedicated interface configured to receive data with the first priority and the fourth dedicated interface configured to receive data with the second priority.

DETAILED DESCRIPTION

Figure 1:
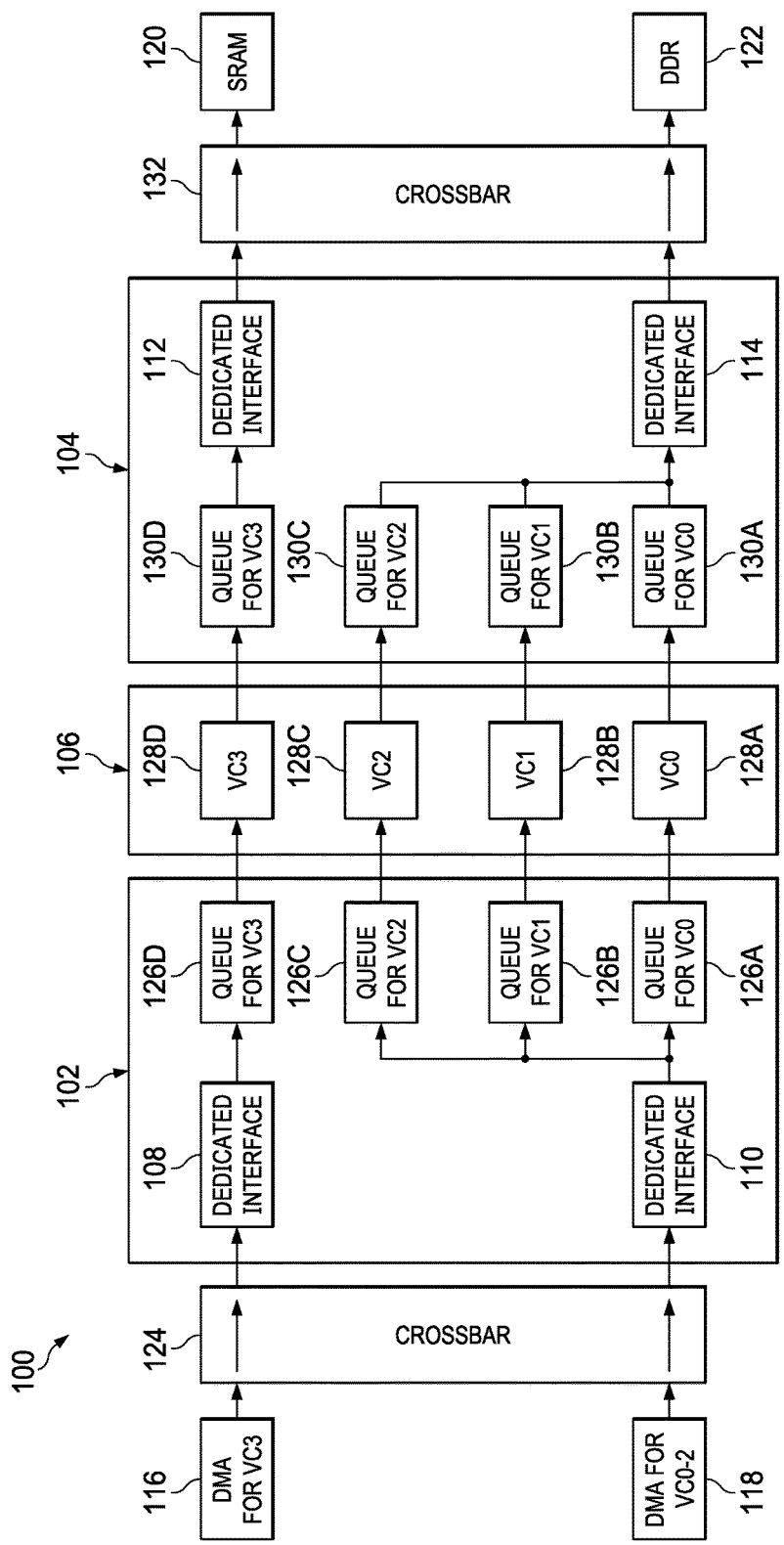
FIG. 1 is a block diagram of a PCIe system with dedicated interfaces in accordance with various examples.

In a PCIe implementation, real-time data or traffic (e.g., voice or video data) is often mixed with non-real-time data or traffic. Real-time traffic is generally considered to be high-priority traffic. Thus, for real-time traffic, low latency and controlled jitter are often essential to preserve quality of the transmission. Latency refers to the amount of time it takes for a data packet to travel from point-to-point on the network. Jitter refers to the variation in latency of packet flow from point-to-point on the network. If jitter is too large, real-time voice or video traffic can exhibit instability.

Large data transmissions can create congestion in the PCIe system by using the resources of the entire PCIe link. If real-time traffic is mixed with long burst traffic, such as a download of a large file using the same PCIe link, high performance of the real-time traffic transmission is maintained by ensuring the real-time traffic is not impacted by the large download. The large download can be throttled so the real-time traffic has adequate resources to achieve low latency and controlled jitter.

When the same link is used for real-time traffic and non-real-time traffic, often the non-real-time traffic is sent to slow memory like flash memory or double data rate (DDR) memory. Those types of memories have additional latency because they are naturally slower. In addition, DDR has self-refresh, which is a type of standby mode that reduces power, which can cause additional delays. In contrast, real-time traffic is often sent to dedicated, high-speed memory, such as static random-access memory (SRAM). When real-time traffic and non-real-time traffic are mixed, head of line blocking can occur. Head of line blocking occurs when a packet or packets in a queue are delayed by another packet in the front of the queue. This can cause quality-of-service problems if real-time traffic has to wait behind non-real-time traffic. The PCIe standard has multiple VCs, so different types of traffic can be separated onto separate VCs. Separating the traffic on different VCs, however, does not always prevent head of line blocking. This type of separation only mitigates blocking inside the PCIe link. Blocking can still occur at a physical interface in the PCIe system.

In a conventional implementation, all the VC traffic is transmitted through a single physical interface into or out of the PCIe system. Even though VCs are separate within the PCIe link, traffic for all the VCs is first channeled through a single interface. On the receive side, head of line blocking can occur in the single interface. Separating real-time traffic from non-real-time traffic using the VCs does not keep those types of traffic separate as the traffic goes through the shared interface. Non-real-time traffic can consume the resources of the shared interface, forcing the real-time traffic to wait.

The PCIe transmit side may have similar issues. Direct memory access (DMA) resources can be devoted to real-time traffic, such as a separate DMA device. However, in many examples, only one interface handles traffic entering the PCIe system. Therefore, large amounts of non-real-time traffic can block real-time traffic at this single interface.

In some cases, the interface is a single port. A crossbar connects to the single interface over a single connection. The crossbar receives traffic requests from initiators (such as the DMA devices) and performs an arbitration to manage the traffic transmitted across the single interface. If the single interface is busy, incoming traffic has to wait behind traffic already in the queue. One solution to this problem is to use a dedicated PCIe link for real-time traffic, and another PCIe link for non-real-time traffic. However, this solution can be expensive, as the number of PCIe links is doubled.

In examples herein, a first dedicated interface is used for a first type of traffic, such as real-time traffic, while a second dedicated interface is used for a second type of traffic, such as non-real-time traffic. The dedicated interfaces can be implemented on both the transmit side and the receive side of the PCIe system. The dedicated interfaces on the transmit side can also be called egress interfaces or transmit interfaces. The dedicated interfaces on the receive side can also be called ingress interfaces or receive interfaces. The interfaces can be used to separate any types of traffic, not just real-time traffic and non-real-time traffic, as long as those types of traffic use different VCs. For example, traffic with a first priority or class of service can use the first dedicated interface while traffic with a second priority or class of service can use the second dedicated interface. The dedicated interfaces can be mapped to VCs, so each VC has its own dedicated interface. Thus, the traffic in each VC is protected from end to end, in part by having its own dedicated interface. In an example, more than two dedicated interfaces can be implemented on both the transmit side and the receive side.

FIG. 1 is a PCIe system 100 with dedicated interfaces according to various examples. System 100 includes a PCIe transmit side 102, a PCIe receive side 104, and a PCIe link 106 that connects transmit side 102 to receive side 104. Transmit side 102 and receive side 104 can each be implemented as a component of a system on a chip (SoC) in one example. In system 100, two dedicated interfaces 108 and 110 are implemented on transmit side 102, and two dedicated interfaces 112 and 114 are implemented on receive side 104. Dedicated interfaces 108, 110, 112, and 114 are each dedicated to a specific type of traffic in this example. In one example, real-time traffic with a first priority or class of service may use dedicated interface 108 and dedicated interface 112. Non-real-time traffic with a second priority or class of service may use dedicated interface 110 and dedicated interface 114.

System 100 includes an example DMA device 116 for real-time traffic and an example DMA device 118 for non-real-time traffic. DMA device 116 transmits data traffic to SRAM 120 via PCIe. DMA device 118 transmits data traffic to DDR 122 via PCIe. DMA devices 116 and 118 transmit data traffic through crossbar 124 and into transmit side 102 in this example. Crossbar 124 is configured to have at least two output ports (not expressly shown in FIG. 1), so that one dedicated output port handles traffic for dedicated interface 108 and one dedicated output port handles traffic for dedicated interface 110. Crossbar 124 can include any number of input ports and output ports in other examples. Crossbar 124 manages separate independent paths within the crossbar 124 for traffic from DMA device 116 and DMA device 118. Therefore, traffic from DMA device 118 will not interfere with traffic from DMA device 116 within crossbar 124.

Traffic that is transmitted from DMA devices 116 and 118 to transmit side 102 is managed by the system 100 using VCs. Transmit side 102 receives the traffic and manages the traffic using virtual channel queues dedicated to the VCs. Queues 126A, 126B, 126C, and 126D (collectively, queues 126) are transmit queues that are used by transmit side 102 in this example. Each queue of queues 126 corresponds to a VC. In this example, four VCs 128A, 128B, 128C, and 128D (collectively, VCs 128) are used by PCIe link 106 to transmit data from transmit side 102 to receive side 104. Each VC of VCs 128 has a corresponding VC number that represents the priority associated with that VC. In this example VC 128A is VC 0, VC 128B is VC1, VC 128C is VC2, VC 128D is VC3. The VC numbers (0, 1, 2, or 3) indicate the order of priority, with higher numbers having higher priority. VC3 (VC 128D) has the highest priority in this example, and VC0 (VC 128A) has the lowest priority.

In PCIe, traffic classes (TCs) provide the ability to prioritize traffic, and VCs form the basis for an arbitration policy for hardware resources based on the TCs. VCs are logical constructs that appear as a dedicated physical connection. In PCIe, TCs are assigned or mapped to VCs (e.g., using the TC-to-VC mapping that is part of the PCIe standard). Arbitration policies is then associated with each TC/VC mapping. For example, a TC of 3 can be associated with VC 3. Then, if traffic from DMA device 116 is assigned a TC of 3, traffic from DMA device 116 is transmitted across PCIe link 106 via VC3. In this example, any traffic assigned to TC 3 will use VC3. VCs provide buffers, buffer management, and flow control logic that are used to implement the TCs and any arbitration policies. Assignments of traffic to TCs can be made by a user in one example.

VCs have an order of priority as described above. A higher VC number indicates a higher priority. Therefore, if traffic from different VCs are sent to a common interface or port, the common interface or port enforces an arbitration policy to determine how to prioritize the traffic from the different VCs. For example, receive side 104 includes receive queues 130A, 130B, 130C, and 130D (collectively, queues 130). Each queue of queues 130 corresponds to a VC. Queues 130 each correspond to a VC 128, and manage the traffic from the respective VC 128. Traffic from VC 128D is transmitted to queue 130D. Traffic from queue 130D is then transmitted to dedicated interface 112. In this example, dedicated interface 112 receives traffic only from VC 128D.

In system 100, traffic from VCs 128A, 128B, and 128C is transmitted to each VCs' respective queue 130 in receive side 104. At receive side 104, dedicated interface 114 receives traffic from queues 130A, 130B, and 130C. Then, dedicated interface 114 arbitrates the traffic according to the priority of the VCs 128. Traffic from dedicated interfaces 112 and 114 is transmitted to crossbar 132, where the traffic is forwarded to the appropriate destination, such as SRAM 120 or DDR 122.

In an example operation, real-time traffic (or traffic with a first priority) flows through system 100 via PCIe link 106. Real-time traffic could include voice or video traffic, such as an Internet Protocol (IP) telephony call or a video call. At the same time, a large data file could also be transferred over PCIe link 106. The large data file may be a file download, which is non-real-time traffic and has a second priority that is lower than the first priority traffic. In this example, the use of dedicated interfaces (e.g., 108, 110, 112, 114) and the VC mechanisms in PCIe can keep large amounts of non-real-time traffic from slowing down real-time traffic through system 100.

Real-time traffic avoids the slowdown caused by non-real-time traffic by using dedicated resources throughout system 100. For example, real-time traffic is transmitted from DMA device 116 to crossbar 124. Non-real-time traffic is transmitted from DMA device 118 to crossbar 124. To provide a higher priority to real-time traffic, the path between DMA device 116 and crossbar 124 can be separate and independent from the path between DMA device 118 and crossbar 124. Therefore, non-real-time traffic will not slow down real-time traffic within an SoC that contains DMA devices 116, 118, and crossbar 124, while the traffic is transmitted from the DMA devices 116, 118 to crossbar 124. Also, at crossbar 124, real-time traffic has a dedicated path into and out of crossbar 124. Non-real-time traffic has a dedicated path into and out of crossbar 124 that is completely separate and independent from the real-time traffic path. In this manner, non-real-time traffic does not interfere with or slow down real-time traffic flowing through crossbar 124. In another example, crossbar 124 implements an arbitration policy to ensure real-time traffic in crossbar 124 has priority over any non-real-time traffic in crossbar 124 for any of the various resources within crossbar 124.

After exiting crossbar 124, real-time traffic enters transmit side 102 of the PCIe system through dedicated interface 108. Non-real-time traffic enters transmit side 102 of the PCIe system through dedicated interface 110. The separate dedicated interfaces 108 and 110 ensure that real-time traffic does not have to wait behind non-real-time traffic at the interface into transmit side 102. Dedicated interfaces 108 and 110 remove a bottleneck that would otherwise occur at transmit side 102 as real-time traffic and non-real-time traffic attempt to enter transmit side 102 simultaneously.

In transmit side 102, real-time traffic flows through dedicated interface 108 to queue 126D. The real-time traffic can be assigned a TC by a policy set by a user, the policy indicating that the real-time traffic will use VC 128D. In this example, real-time traffic is assigned only to VC 128D, which has the highest priority of the VCs 128. Real-time traffic therefore flows through queue 126D and over VC 128D through PCIe link 106.

In transmit side 102, non-real-time traffic is provided into dedicated interface 110 and is then assigned to queues 126A, 126B, and 126C. Arbitration and other policies determine how the non-real-time traffic is distributed amongst queues 126A, 126B, and 126C. Non-real-time traffic is then transmitted across PCIe link 106 over VCs 128A, 128B, and 128C. These three VCs 128A, 128B, 128C can provide three different levels of priority for the non-real-time traffic across PCIe link 106. However, the non-real-time traffic does not interfere with or slow down the real-time traffic across PCIe link 106 because real-time traffic has a dedicated VC 128D with the highest priority.

On receive side 104, traffic from VCs 128 is received at a respective queue 130 for each VC 128. Real-time traffic on VC 128D has a dedicated queue 130D, while the other three VCs 128A, 128B, and 128C also have dedicated queues 130 for each of the respective VCs 128A, 128B, 128C. Real-time traffic exits queue 130D and is transmitted to dedicated interface 112. Dedicated interface 112 is an interface on receive side 104 that transmits traffic out of receive side 104 and into crossbar 132 in this example. Dedicated interface 112 is dedicated to real-time traffic in this example, and only receives traffic from queue 130D. Real-time traffic is then provided to crossbar 132 through dedicated interface 112. Therefore, real-time traffic has a dedicated path through receive side 104 and is not delayed by non-real-time traffic in receive side 104.

Non-real-time traffic travels on VCs 128A, 128B, and 128C and then into queues 130A, 130B, and 130C. Queues 130A, 130B, and 130C provide non-real-time traffic to dedicated interface 114. Receive side 104 performs arbitration and executes other policies to prioritize non-real-time traffic as the traffic flows through receive side 104. In this example, non-real-time traffic uses three VCs 128A, 128B, 128C, and therefore is associated with three different TCs. The non-real-time traffic in queues 130A, 130B, and 130C is prioritized according to VC number. Traffic on VC2 (128C) has higher priority than traffic on VC1 (128B), which has higher priority than traffic on VC0 (128A).

Real-time traffic and non-real-time traffic flow through dedicated interfaces 112 and 114, respectively, to crossbar 132. Like crossbar 124, crossbar 132 is configured to have at least two input ports and two output ports. A first dedicated input port and a first dedicated output port on crossbar 132 handle traffic for dedicated interface 112, while a second dedicated input port and a second dedicated output port on crossbar 132 handle traffic for dedicated interface 114. Crossbar 132 can include any number of input ports and output ports in other examples. Crossbar 132 manages separate and independent paths within the crossbar 132 to separate different types of traffic, such as real-time traffic and non-real-time traffic.

Crossbar 132 provides real-time traffic to SRAM 120 in this example. Crossbar 132 also provides non-real-time traffic to DDR 122. Separate and independent paths can be used between crossbar 132 and each of these memories (SRAM 120 and DDR 122) to help prevent non-real-time traffic from blocking real-time traffic.

In one example, SRAM 120 can include arbitration protocols so that real-time traffic in system 100 takes priority over other transactions involving SRAM 120. Other components in an SoC or a computer system may engage in transactions with SRAM 120, not just the real-time traffic over PCIe described herein. Arbitration at SRAM 120 can examine pending transactions and decide whether to give priority to real-time traffic over PCIe link 106 in system 100. Giving priority to this real-time traffic at SRAM 120 can also help to reduce latency and jitter for real-time traffic.

The examples described above can provide real-time traffic with dedicated resources and higher priority than non-real-time traffic in system 100. These resources and priority can reduce latency and jitter in system 100 that are caused by non-real-time traffic consuming resources or blocking real-time traffic in system 100.

Figure 2:
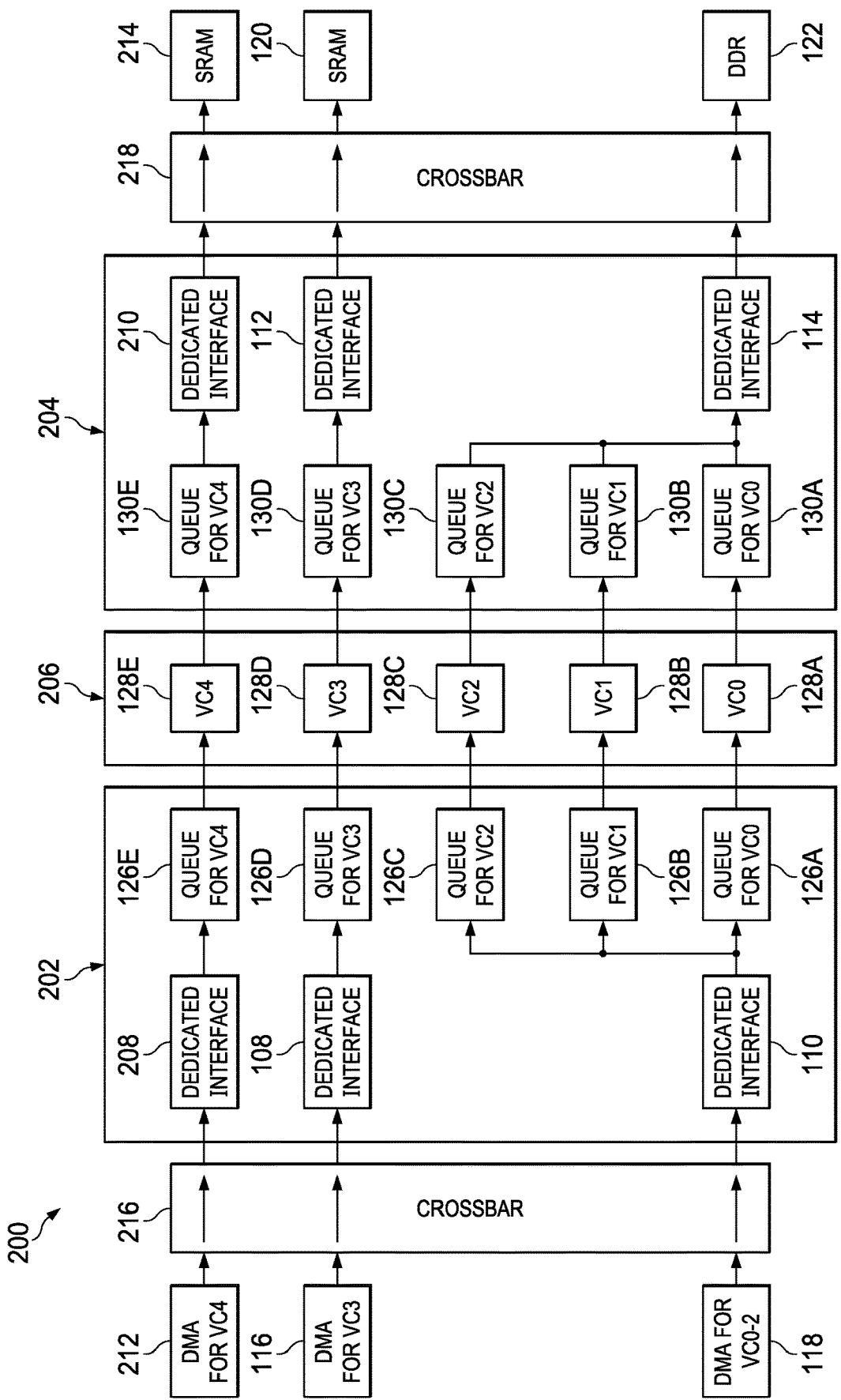
FIG. 2 is a block diagram of a PCIe system with dedicated interfaces in accordance with various examples.

FIG. 2 is a PCIe system 200 with dedicated interfaces according to various examples. Many of the components in system 200 are also present in system 100, and like reference numerals indicate like components. System 200 includes a PCIe transmit side 202, a PCIe receive side 204, and a PCIe link 206. System 200 includes three dedicated interfaces 108, 110, and 208 on transmit side 202. System 200 also includes three dedicated interfaces 112, 114, and 210 on receive side 204. Dedicated interface 208, in this example, is a dedicated interface for DMA device 212. Dedicated interface 210, in this example, handles traffic transmitted to memory 214.

In system 200, traffic over VCs 128A, 128B, and 128C is non-real-time traffic (or traffic of a lower priority) and is transmitted over PCIe link 206 according to the examples described above with respect to FIG. 1. DMA device 118 sends this traffic through crossbar 216 to dedicated interface 110, then to queues 126A, 126B, and 126C in transmit side 202. The non-real-time traffic is transmitted over PCIe link 206 via VCs 128A, 128B, and 128C, and into queues 130A, 130B, and 130C. The non-real-time traffic is transmitted through dedicated interface 114 and through crossbar 218 to DDR 122.

Also, in system 200, traffic from DMA device 116 is real-time traffic (or traffic of a higher priority than the non-real-time traffic) and is sent through crossbar 216 to dedicated interface 108. The real-time traffic is sent to queue 126D and transmitted over PCIe link 206 via VC 128D. The traffic is transmitted to queue 130D on receive side 204 and then through dedicated interface 112 to crossbar 218. Crossbar 218 forwards the traffic to SRAM 120, as described above with respect to FIG. 1.

System 200 includes a third dedicated interface 208 on transmit side 202 and a third dedicated interface 210 on receive side 204 in this example. System 200 can transmit real-time traffic or other high priority traffic from DMA device 212, through crossbar 216, and through dedicated interface 208 into transmit side 202. The traffic from DMA device 212 then enters queue 126E. In this example, queue 126E is the queue for VC 128E (VC4). VC 128E has the highest priority of the VCs 128 in system 200. The traffic is transmitted across PCIe link 206 via VC 128E to queue 130E in receive side 204. Receive side 204 also has a dedicated interface 210 for traffic from VC 128E. Dedicated interface 210 transmits the traffic through crossbar 218 to memory 214. In an example, memory 214 is SRAM. Other types of memory may be used in other examples.

In some examples, traffic from DMA device 212 could be sent to a different memory, such as SRAM 120. In that case, SRAM 120 would use arbitration to determine a priority of the traffic from DMA device 212 and DMA device 116. In one example, DMA device 212 would take priority because its traffic is assigned to a higher TC/VC than traffic from DMA device 116.

System 200 is useful for providing dedicated interfaces (e.g., 108, 110, 112, 114) to multiple types of real-time traffic, or for providing dedicated interfaces for multiple types of high priority traffic. Traffic of a first priority can use the path from dedicated interface 208, through VC 128E, and to dedicated interface 210. Traffic of a second priority can use the path from dedicated interface 108, through VC 128D, and to dedicated interface 112. Traffic of a third priority can use the path from dedicated interface 110, through VCs 128A, 128B, and 128C, and to dedicated interface 114.

With system 200, multiple types of high priority traffic can avoid delays caused by non- real-time traffic or lower priority traffic, which is allocated to VCs 128A, 128B, and 128C and uses dedicated interfaces 110 and 114. The PCIe standard provides for eight traffic classes and eight virtual channels, so up to eight dedicated interfaces could be used on the transmit side and on the receive side to separate traffic of different priorities. Crossbars 216 and 218 can include dedicated ports into and out of the crossbars 216 and 218 for each dedicated interface. Different memories are also useful for reducing latency and jitter by providing dedicated paths for traffic to each separate memory. With dedicated paths to each memory, traffic transmitted to a first memory does not have to wait for traffic in transit to a second memory to finish transmitting.

Figure 3:
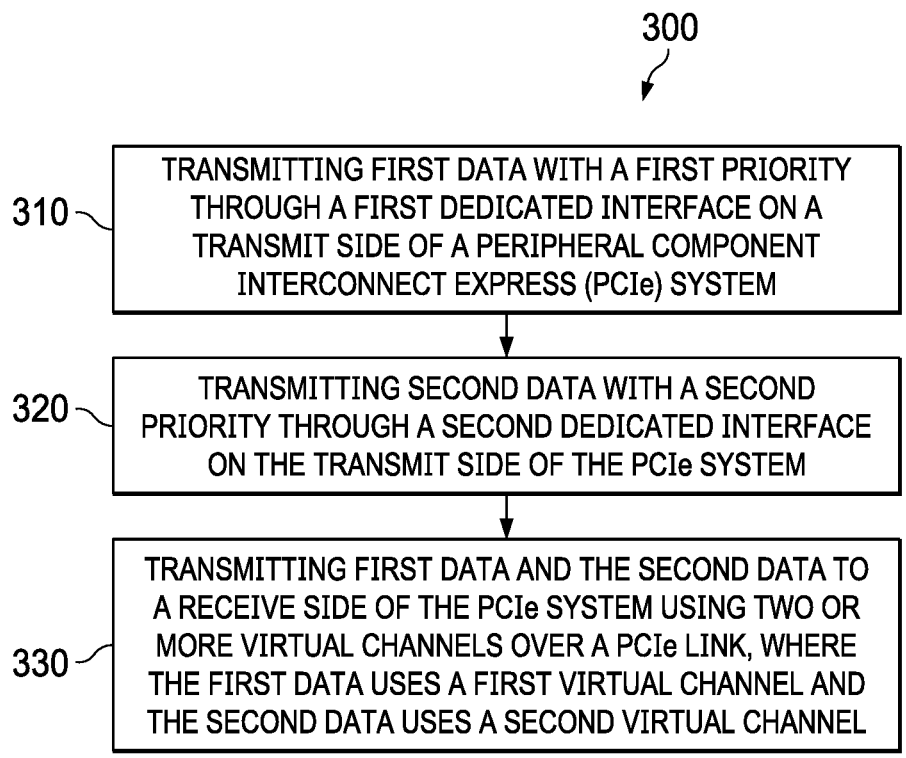
FIG. 3 is a flowchart of a method for improving latency and jitter of traffic over PCIe in accordance with various examples.

FIG. 3 is a flowchart of an example method 300 for improving latency and jitter of traffic over PCIe. Although the method is described in conjunction with FIGS. 1-2, any system configured to perform the method, in any suitable order, falls within the scope of this description. In one example, components of system 100 perform method 300.

Method 300 begins at 310, where first data is transmitted with a first priority through a first dedicated interface on a transmit side of a peripheral component interconnect express (PCIe) system. In an example, the first data is real-time traffic transmitted through dedicated interface 108 in FIG. 1. The first data could also be transmitted with a first class of service in addition to or instead of a first priority.

Method 300 continues at 320, where second data is transmitted with a second priority through a second dedicated interface on the transmit side of the PCIe system. In an example, the second data is non-real-time traffic transmitted through dedicated interface 110 in FIG. 1. The second data could also be transmitted with a second class of service in addition to or instead of a second priority.

Method 300 continues at 330, where the first data and the second data are transmitted to a receive side of the PCIe system using two or more virtual channels (VCs) over a PCIe link. The first data uses a first VC and the second data uses a second VC. In system 100 in FIG. 1, the first data uses VC 128D, while the second data uses VCs 128A, 128B, and 128C. In other examples, the second data could use a single VC, or the first data could use multiple VCs.

After 330 of method 300, the first data can be received at a first destination through a third dedicated interface on the receive side of the PCIe system. In the example of FIG. 1, the first destination is SRAM 120, and the third dedicated interface is dedicated interface 112.

Also, the second data can be received at a second destination through a fourth dedicated interface on the receive side of the PCIe system. In the example of FIG. 1, the second destination is DDR 122, and the fourth dedicated interface is dedicated interface 114.

In an example, a fifth dedicated interface is dedicated interface 208, and a sixth dedicated interface is dedicated interface 210. In another example, up to eight dedicated interfaces on transmit side 202 and up to eight dedicated interfaces on receive side 204 can be implemented to provide eight separate paths for traffic through the PCIe system.

Examples herein provide methods and systems to use PCIe as an integrated interface that can carry multiple types of traffic without compromising real-time traffic latency and jitter performance. In addition, the examples herein accomplish this without using a second PCIe link dedicated to a specific type of traffic. One example herein uses a first dedicated interface for real-time traffic and a second dedicated interface for non-real-time traffic, to separate the real-time traffic from the non-real-time traffic from end-to-end.

Also, examples herein allocate memory with low and deterministic access time for real-time traffic, such as SRAM. Parallel paths to memory are implemented inside an SoC to avoid crossing real-time traffic with non-real-time traffic from a crossbar to memory. In some examples, arbitration policies are useful to prioritize real-time traffic over non-real-time traffic throughout the system. Head of line blocking of real-time traffic is also eliminated by separating traffic types.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means +/−10 percent of the stated value. Modifications are possible in the described examples, and other examples are possible within the scope of the claims.

What is claimed is:

1. A method, comprising:
   receiving first data with a first priority at a first interface that is associated with a first virtual channel of a peripheral component interconnect express (PCIe) link;
   transmitting the first data through the first interface to a first queue associated with the first virtual channel;
   receiving second data with a second priority at a second interface that is associated with a second virtual channel of the PCIe link, wherein the second interface is distinct from the first interface;
   transmitting the second data through the second interface to a second queue associated with the second virtual channel, wherein the second queue is distinct from the first queue; and
   transmitting the first data and the second data to a receiving device over the PCIe link, wherein the first data uses the first virtual channel and the second data uses the second virtual channel.

2. The method of claim 1, further comprising:
   receiving the first data at a first destination through a third interface of the receiving device; and
   receiving the second data at a second destination through a fourth interface of the receiving device, wherein the fourth interface is distinct from the third interface.

3. The method of claim 1, wherein the first virtual channel has a higher priority than the second virtual channel.

4. The method of claim 1, wherein the first data is received at the first interface from a first output port of a crossbar.

5. The method of claim 1, wherein the second data is received at the second interface from a second output port of a crossbar.

6. The method of claim 1, wherein the first data is real-time traffic, and the second data is non-real-time traffic.

7. The method of claim 1, wherein:
   the first data is received at the first interface from a first direct memory access (DMA) unit;
   the second data is received at the second interface from a second DMA unit; and
   the first DMA unit is distinct from the second DMA unit.

8. A system, comprising:
   a peripheral component interconnect express (PCIe) system, the PCIe system including:
   a transmit side including a first dedicated interface and a second dedicated interface, the first dedicated interface coupled to a first transmit queue for a first virtual channel, and the second dedicated interface coupled to a second transmit queue for a second virtual channel; and
   a crossbar having a first dedicated output port coupled to the first dedicated interface and a second dedicated output port coupled to the second dedicated interface.

9. The system of claim 8, further comprising:
   a first direct memory access (DMA) device coupled to a first dedicated input port of the crossbar, and a second DMA device coupled to a second dedicated input port of the crossbar.

10. The system of claim 8, further comprising:
    a PCIe link including the first virtual channel and the second virtual channel; and
    a receive side including a first receive queue for the first virtual channel and a second receive queue for the second virtual channel, the receive side also including a third dedicated interface coupled to the first receive queue and a fourth dedicated interface coupled to the second receive queue.

11. The system of claim 10, wherein the crossbar is a first crossbar, and the system further includes a second crossbar with a first dedicated input port coupled to the third dedicated interface and a second dedicated input port coupled to the fourth dedicated interface.

12. The system of claim 11, further comprising:
    a first memory coupled to a first dedicated output port of the second crossbar, and a second memory coupled to a second dedicated output port of the second crossbar.

13. The system of claim 10, further comprising:
    a fifth dedicated interface on the transmit side coupled to a third transmit queue for a third virtual channel; and
    a sixth dedicated interface on the receive side coupled to a third receive queue for the third virtual channel.

14. The system of claim 8, wherein the second dedicated interface and the second transmit queue are associated with a set of virtual channels that does not include the first virtual channel.

15. A system, comprising:
    a peripheral component interconnect express (PCIe) transmit side including:
    a first interface associated with a first virtual channel of a PCIe link;
    a first queue coupled to the first interface;
    a second interface associated with a second virtual channel of the PCIe link;
    a second queue coupled to the second interface, wherein:
    the first interface is configured to receive data with a first priority;
    the second interface is configured to receive data with a second priority;
    the first interface is distinct from the second interface; and
    the first queue is distinct from the second queue;
    a PCIe link coupled to the PCIe transmit side, the PCIe link including the first virtual channel and the second virtual channel, the first virtual channel configured to transmit data with the first priority and the second virtual channel configured to transmit data with the second priority; and
    a PCIe receive side including a third interface and a fourth interface, the third interface configured to receive data with the first priority and the fourth interface configured to receive data with the second priority.

16. The system of claim 15, wherein the PCIe receive side includes:
    a third queue associated with the first virtual channel and coupled to the third interface; and
    a fourth queue associated with the second virtual channel and coupled to the fourth interface.

17. The system of claim 15, wherein the first interface, the first queue, and the third interface provide a path for data with the first priority.

18. The system of claim 17, wherein:
    the path is a first path,
    the second interface, the second queue, and the fourth interface provide a second path for data with the second priority, and
    the first path and the second path are independent paths.

19. The system of claim 15, wherein the first interface is coupled to a first dedicated output port of a crossbar, and the second interface is coupled to a second dedicated output port of the crossbar.

20. The system of claim 15, wherein a first direct memory access (DMA) device is configured to transmit data with the first priority to the first interface, and a second DMA device is configured to transmit data with the second priority to the second interface.

* * * * *